Figure 1A:
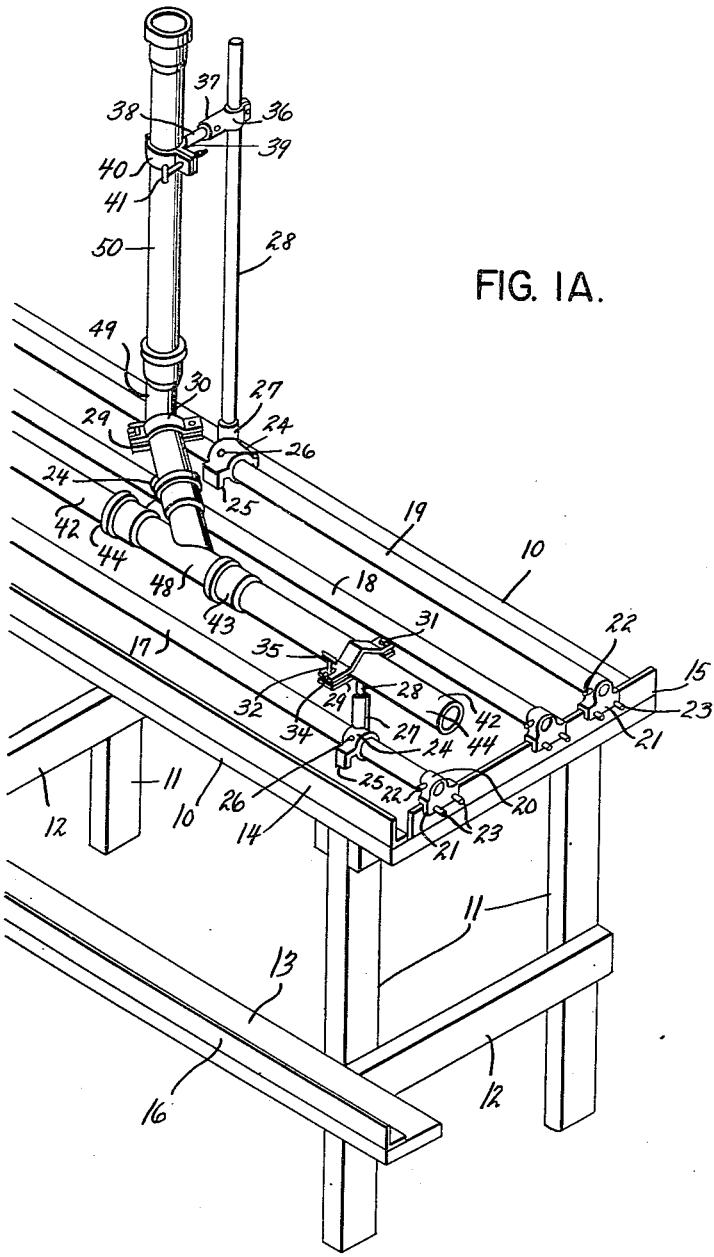

Dec. 18, 1956  J. L. SMITH ET AL  2,774,134
PLUMBER'S PIPE JIG
Filed Oct. 22, 1953  5 Sheets-Sheet 1
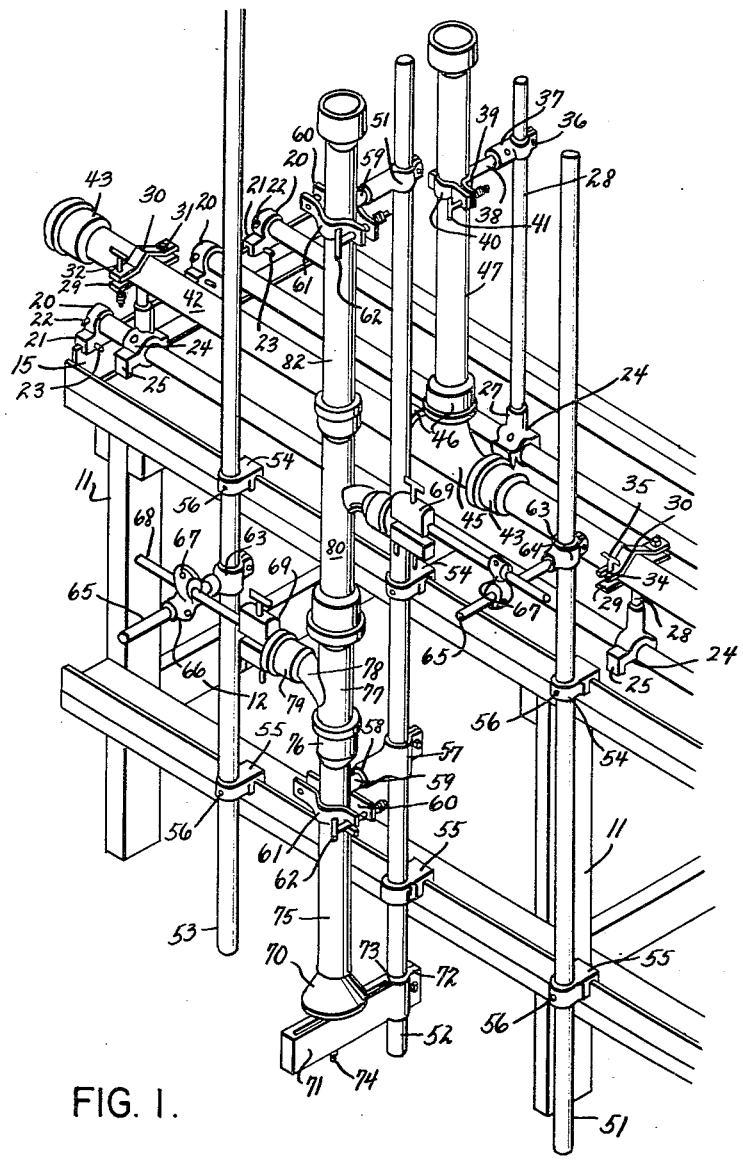
FIG. I.
INVENTORS
JOHN L. SMITH
EDWIN E. McCARTNEY
BY Wilkinson & Mawhinney
ATTORNEYS Dec. 18, 1956  J. L. SMITH ET AL  2,774,134
PLUMBER'S PIPE JIG
Filed Oct. 22, 1953  5 Sheets-Sheet 3

INVENTORS
JOHN L. SMITH
EDWIN E. McCARTNEY
BY Wilkinson & Mawhinney
ATTORNEYS

Dec. 18, 1956  J. L. SMITH ET AL  2,774,134
PLUMBER'S PIPE JIG
Filed Oct. 22, 1953  5 Sheets-Sheet 4

INVENTORS
JOHN L. SMITH
EDWIN E. McCARTNEY
BY Wilkinson & Mawhinney
ATTORNEYS

Dec. 18, 1956   J. L. SMITH ET AL   2,774,134
PLUMBER'S PIPE JIG

Filed Oct. 22, 1953   5 Sheets-Sheet 5

INVENTORS
JOHN L. SMITH
EDWIN E. McCARTNEY
BY Wilkinson & Mawhinney
ATTORNEYS

United States Patent Office 2,774,134
Patented Dec. 18, 1956

2,774,134

PLUMBER'S PIPE JIG

John Lawrence Smith and Edwin Elmo McCartney, Memphis, Tenn.

Application October 22, 1953, Serial No. 387,732

2 Claims. (Cl. 29—286)

The present invention relates to plumber's pipe jigs and has for an object to provide a flexible jig used in fabricating or joining together desired lengths, shapes and sections of soil pipe from existing pipes and sections of pipes and fittings.

The purpose of the invention is to provide a jig upon which may be joined together the various pipe sections in a quick and facile manner as an improvement over the old method of laying the pipe sections on the ground or on bricks or upon a wooden jig constructed especially for each job and thereafter discarded as worthless after a single use.

A further object of the invention is to provide a jig having adjustable pipe holders for moving longitudinally and angularly with respect to one another for the purpose of improvising a form or pattern upon which the various pipe sections may be assembled in a preselected relative arrangement as required for adaptability to each particular job.

The invention also contemplates an improved jig having a large range of movements of its relative pipe holders to promote a high degree of flexibility in the jig adapting the same to a wide variety of forms and patterns of soil pipe assembly to fit the needs of any particular building requirements.

A still further object of the invention is to provide a jig in which the adjustments may be made quickly and retained in adjusted position with certainty.

The invention also provides for lowering the pipe assembly into the pit and further provides for holding the sections so that the joints may be caulked while supported in better working position.

A further object of the invention is to provide an attachment that extends into the pipe fitting itself, holding it firmly, such attachment being capable of swiveling throughout the whole three hundred sixty degrees of the circle.

With the foregoing and other objects in view, the invention will be more fully described hereinafter, and will be more particularly pointed out in the claims appended hereto.

Figure 2:
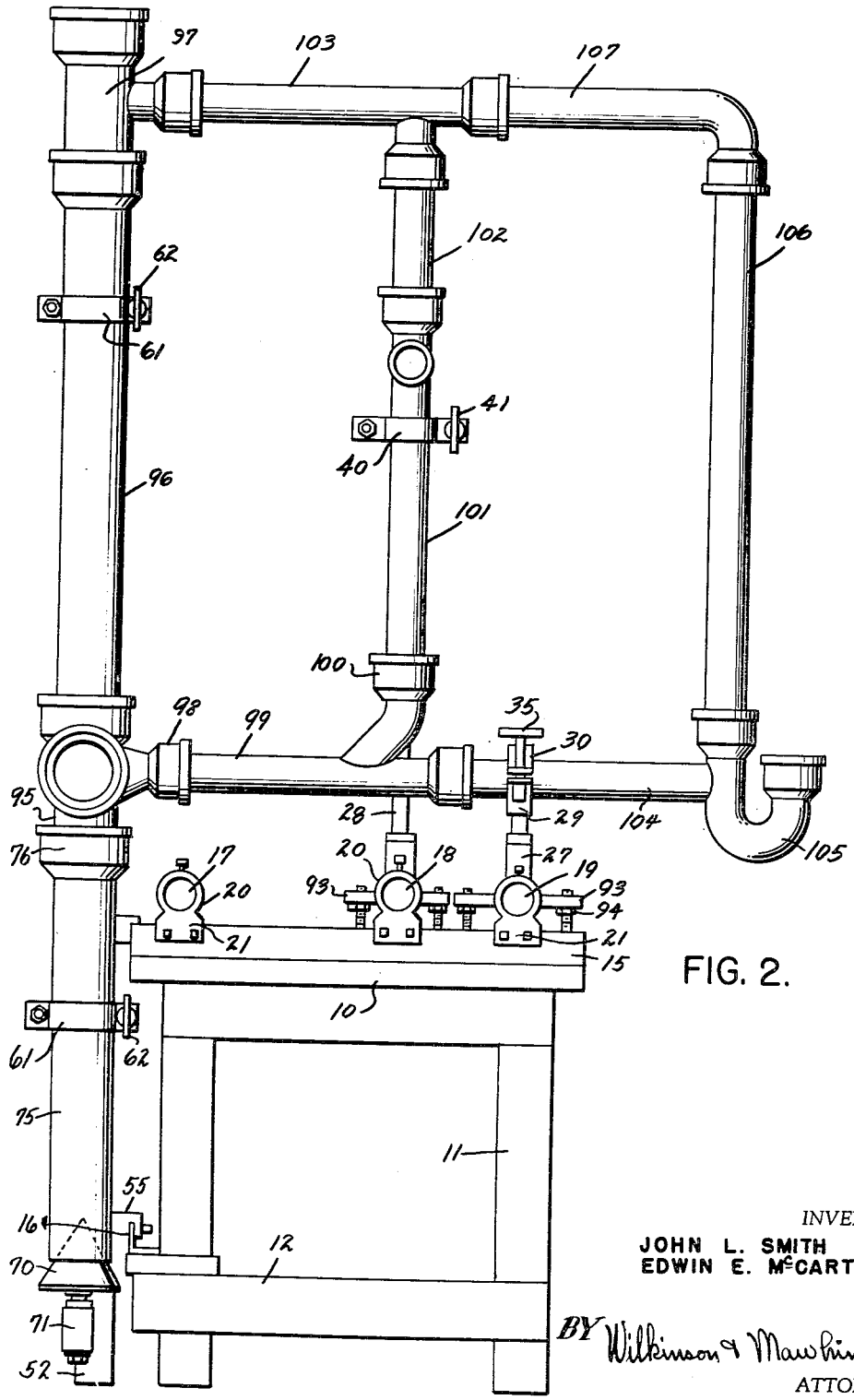
Figure 3:
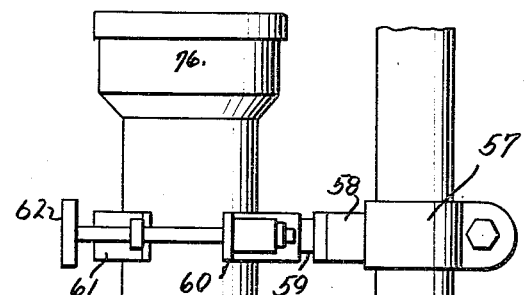
Figure 5:
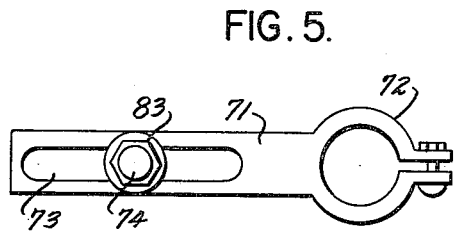
Figure 6:
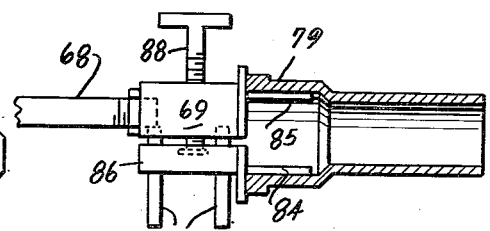
Figures 7, 8:
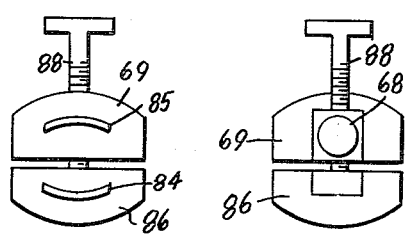
Figure 4:
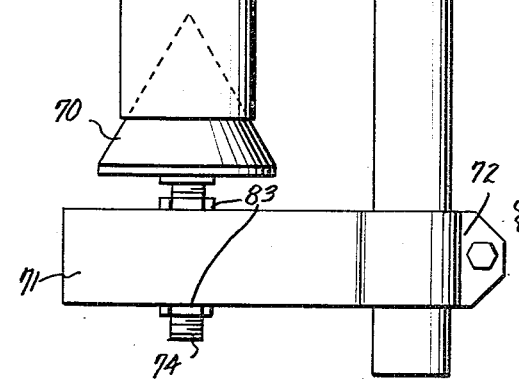
Figure 9:
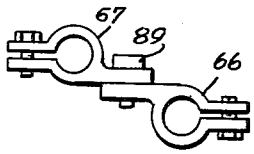
Figure 16:
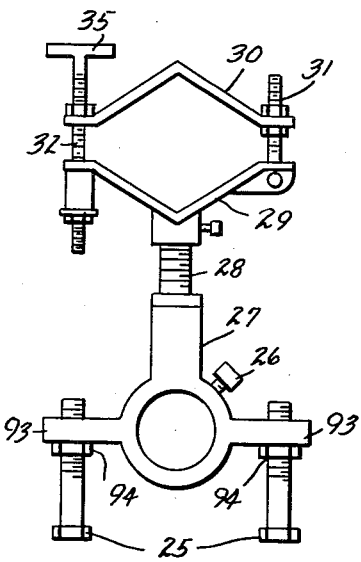
Figure 10:
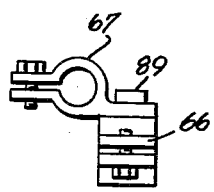
Figure 11:
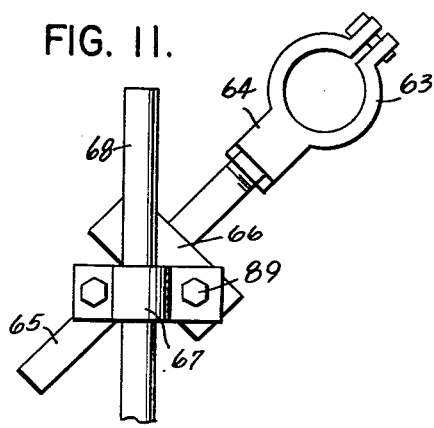
Figure 12:
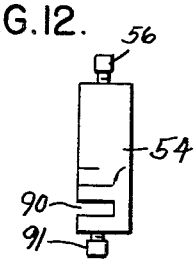
Figure 14:
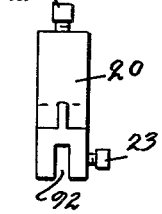
Figure 13:
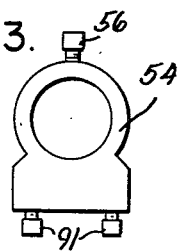
Figure 15:
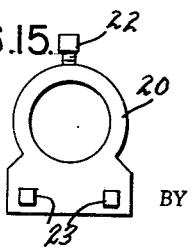

In the drawings, wherein like symbols refer to like or corresponding parts throughout the several views:

Figures 1 and 1ª are isometric views of a plumber's pipe jig constructed in accordance with the present invention, Figure 1ª being a continuation from the right end of Figure 1, Figure 2 is an end elevational view of the same taken from the right end of Figure 1ª and showing a different pipe assembly, Figure 3 is an end elevational view of the cone-shaped attachment and adjacent parts with the vertical rod support broken away, Figure 4 is a similar view with the pipe section and its supporting clamp removed, Figure 5 is a bottom plan view of the main pipe holder with the cone removed, Figure 6 is a fragmentary front elevational view of the swivel attachment with parts broken away and the pipe shown in section, Figure 7 is an end view of the same from the right end of Figure 6, Figure 8 is an end view of the swivel attachment from the left end of Figure 6, Figure 9 is a side elevational view of the duplex clamps in extended relation, Figure 10 is a similar view with one of the clamps rotated to a position at ninety degrees from its position in Figure 9, Figure 11 is a top plan view of the duplex articulated clamps in association with their support rod and clamp, Figure 12 is an edge elevational view of a form of longitudinal sliding clamp, Figure 13 is a plan view of the same, Figure 14 is an edge view of a form of transverse sliding clamp, Figure 15 is a plan view of the same, and Figure 16 is an end elevational view of a form of longitudinal adjustable detachable clamp.

Referring more particularly to the drawings, 10 designates a bed or base which forms the base or support and may be in the form, as shown, of a bench or table supported upon legs 11 to which are attached transverse beams 12 having extensions at one side of the bench for the support of a longitudinal beam 13.

Erected upon the bench are longitudinal and transverse rails 14 and 15 preferably at the longitudinal and side edges respectively of such bench. These rails may be of angle iron construction if desired. The horizontal beam 13, which is stepped down from the bench 10, supports a longitudinal rail 16.

Supported upon the bench 10 are horizontal guide and support rods or tubes 17, 18 and 19 which are shown to be horizontally spaced apart and in substantially parallel relation. These rod supports may be in any suitable number, the three illustrated being exemplary. These rod supports are carried in spaced relation above the bench 10 by sockets 20 in which the opposite ends of the rods are entered being secured therein by set screws 22 or other appropriate means.

The sockets 20 are carried upon inverted U-clamps which are slidable on the transverse rails 15 and secured in adjusted position thereon by the set screws 23. The rod supports 17, 18, 19 carry sliding collars 24 having offset stabilizing feet 25 which may slide along the top surface of the bench 10. The collars are affixed in adjusted position by set screws 26 and have upstanding sockets 27 carrying clamp stems or rods 28. At their upper ends the rods support fixed clamp jaws 29 which cooperate with detachable clamp jaws 30. The jaws may be pivoted or hinged at one end 31 while being openable at their other ends.

Swivel bolts 32 are carried by the fixed jaws 29 at the open ends and are adapted to swing into and out of slots 34 in the open ends of the detachable jaws 30. Such bolts have handles 35 by which they are screwed down to make tight the clamp after swinging into the slots.

The clamp stems or rods 28 are detachable in the sockets 27 and may be of various lengths. Some of these rods 28 carry vertically slidable sleeves or clamps 36 adapted to be bound to the rods in various elevations. Such sleeves 36 carry sockets 37 extending horizontally and adapted to receive horizontal clamp stems 38 carrying fixed clamp jaws 39 which cooperate with the openable clamp jaws 40, the jaws being secured together by the swivel or other clamp bolts 41.

In Figure 2 pipe sections 42 are shown to be assembled upon the bench, such pipe sections being received in the clamps 29, 30 where they extend horizontally. These pipe sections are formed with bell ends 43 and spigots 44. While one pipe section is held in a clamp, an adjoining section is fitted with its spigot end into the bell of the previously clamped section and the necessary caulking operation performed while both pipe sections are held in adjoining clamps. T-sections 45 may also be included in the soil pipe assembly, such sections having bells 46. An angular extending section 47 is shown as erected vertically upon the T-section 45, such vertical pipe section 47 being held in a vertical clamp 39, 40.

Other angle pipe sections 48 may be included in the soil pipe assembly having diagonally extending branches which may fit into other pipe sections or elbow sections 49 supported in a horizontal clamp 29, 30. Vertical offset pipe sections 50 may be erected in the bells of the elbows 49. The vertical offset pipe sections 40 are held by vertical clamps 39, 40.

Referring more particularly to both Figures 1 and 2, 51, 52 and 53 designate vertical rod supports which are in spaced parallel relation and which are carried by longitudinal horizontally sliding clamps 54 and 55. The clamps 54 are slidable upon the longitudinal rail 14 of the bench 10 and may be affixed to this rail in any adjusted position by means of set screws similar to the screws 23. The vertical rod supports 51, 52 and 53 are slidable vertically in the horizontally adjustable clamps 54 and 55 and are held to adjusted position therein by set screws 56 or other device.

Clamps 57 are adjustably mounted on one or more of the vertical rod supports, being shown on the intermediate rod 52. Such clamps carry horizontally extending sockets 58 in which are removably fitted clamp stems or rods 59 to which are attached the fixed clamp jaws 60. Pivotally associated with the fixed jaws 60 are the movable clamp jaws 61 having the swivel or other bolts or devices 62 for urging the clamp jaws together upon the pipe.

Upon the companion vertical rod supports 51 and 53 there are mounted for vertically sliding movement clamps 63 having means associated therewith for binding the clamps in the adjusted position upon the rod supports. These clamps also carry vertically extending sockets 64 in which are removably or otherwise fitted rods 65 which carry clamps 66 slidable thereon and having set screws or other devices for affixing the clamps 66 in adjusted position along the rods 65. The clamps 66 carry other clamps 67 for adjustably supporting therethrough rods 68 carrying attachments 69. These attachments extend into the pipe fitting itself for holding it firmly. The attachment swivels through a complete angular distance of three hundred sixty degrees.

A cone-shaped attachment 70 receives the lower spigot end of the lowermost section 75 of the pipe. Such cone attachment 70 is supported upon a main pipe holder 71 having a clamp 72 by which the same may be vertically adjusted up and down upon the vertical rod supports and also angularly adjusted thereabout as are also the clamps 36, 57, 63, 66 and 67.

The main pipe holder 71 has a vertical slot therethrough elongated in a radial direction with reference to the axis of its rod support 52. A binding bolt 74 from the cone attachment extends adjustably through this slot 73 for permitting the cone 70 to be moved back and forth in the line of the slot and the binding bolt and its nut affords a retaining means for holding the cone in its adjusted position.

The lowermost pipe section 75 has its lower spigot end directed downwardly and entered in the cone 70. The upper bell end 76 of the pipe section 75 is shown as receiving an angle section 77 having the branch 78 with outwardly extending bell 79. This bell receives one of the attachments 69 referred to in a foregoing portion of this specification. At 80 is represented an intermediate pipe section having a T-extension 81 which receives another of the attachments 69. The next upper pipe section 82 is fitted into the intermediate section 80 and is held in place by one of the clamps 60, 61.

In the use of the device, the pipe sections are fitted to the various clamps before or after the clamps are moved to relative locations as prescribed by the form or pattern which the soil pipe assembly is to assume.

It will be understood that clamps of both the horizontal support rods 17, 18, 19 and of the vertical support rods 51, 52, 53 are utilizable conjointly for holding a single assembly form or pattern of the pipe, dependent upon the branches required of the form from the main pipe trunk and the angles and directions which such branches may be required to assume. The clamps 29, 30 are horizontally adjustable longitudinally of the bench and if desired the horizontal rod supports 17, 18, 19 may also be adjusted horizontally through the sockets 20 which are opened through the ends of the apparatus. The plurality of horizontally spaced rod supports 17, 18, 19 provide for the support of horizontally displaced pipe sections such as 50 which are supported by one of the clamps 39, 40. Such clamps also provide for the support of the vertical risers 47, the vertical axis of which is in substantial alignment with the forward rod support 17 while the rod support 28 for the clamp 39, 40 which directly supports the vertical riser 47 is carried by the intermediate rod support 18. For the support of the offset pipe 50 the rearmost rod support 19 is employed.

The vertical rod supports 51, 52 and 53 are vertically adjustable through their clamps 54, 55 and are also horizontally adjustable toward and from one another by virtue of the fact that the clamps 54, 55 slide upon their respective longitudinal rails 14 and 16.

The clamps 66, 67 are united in any desired manner, for instance, they may be swivelly connected about a vertical axis to enable the upper clamp 67 to have its axis angularly adjusted with respect to the clamp 66 to give proper direction to the rod 68 which is supported by the clamp 67. These clamps 66, 67 may be split clamps or they may be collars or sleeves which are relatively slidable with respect to their respective rods 65, 68. These clamps will have set screws, bolts or other suitable devices for binding the same in set position after adjusting. The clamps are preferably of diamond shape.

The cone-shaped attachment 70 at the bottom of the main pipe holder 52 can rotate or be made stationary as required. The cone-shaped attachment 70 can be lowered into a pit, if necessary, to facilitate working on longer sections of pipe or to place the joint being caulked into a better working position.

It will be appreciated by those skilled in the art that by horizontally, vertically and angularly adjusting the various pipe holding clamps, these clamps can be brought to a different variety of positions suitable for supporting the pipe sections wherever directed incident to a dictated pattern required of the composite soil pipe assembly.

The jig is applicable to cast iron soil pipe or to soil pipe made of copper, steel or any other material.

Referring more particularly to Figures 3, 4 and 5, the attachment 70 is a cone-shaped piece of metal on which the pipe 75, being fabricated, rests. The purpose of this attachment is to center the pipe 75 and to hold it firmly. The cone shape 70 facilitates use with various sizes of pipe 75. Connection of attachment 70 to bracket 71 is by means of a threaded shaft or bolt 74 with lock nuts 83 to hold it in the desired position. The bolt 74 may be moved backward and forward in the slot 73 as desired.

Referring more particularly to Figures 6, 7 and 8, the attachment 69 is a vice having lower and upper jaws 84 and 85 adapted to extend into the open end of the hub 79 of a pipe section for the purpose of holding the pipe securely. The jaws 85, 84 are carried by separable sections 69, 86 of the vice, which sections are adjustable toward and from one another by the screw 88, the movement being guided by the guide pins 87 carried by the section 69 and fitted through the companion section 86. The vice-support rod 68 is attached, as by threading, to the main vice section 69, such section swiveling about the rod 68. The center through the jaws 84, 85 is therefore offset from the center line of rod 68 which enables the vice to swivel about the rod 68.

Referring more particularly to Figures 9, 10 and 11, the duplex clamps 66, 67 are swiveled together at 89 to allow for proper alinement.

Referring more particularly to Figures 12 and 13, the longitudinal sliding clamps 54 have slots 90 to fit the rail 14 and set screws 91 to bind the clamps in adjusted positions on the rail.

Referring more particularly to Figures 14 and 15, slots 92 of the transverse sliding clamps 20 fit the cross rails 15. The adjustment is made fast by the set screws 23.

Referring more particularly to Figure 16 the stabilizing feet 25 may be in the form of rods threaded adjustably through threaded apertures in the wings 93 which extend out from the collars 24. Lock nuts 94 on the rods 25 secure the adjustment.

Referring more particularly to Figure 2, a form of pipe layout or pattern is shown in which it is necessary to employ both horizontal and vertical adjusting holding devices.

The cone 70 supports the spigot end of the vertical riser pipe 75 which carries above it the short pipe section 95, in turn supporting above it the pipe sections 96 and 97. The vertical pipes 75 and 96 are shown to be held by clamps 61 of the vertical front holding devices.

The short intermediate pipe section 95 has a horizontal branch 98 to couple with a horizontal pipe section 99 having an angular vertically extending branch 100 with a bell or hub for receiving the vertical pipe section 101 which is maintained in place by the clamp 40 on one of the upstanding rods 28 adjustable along the rod 18.

The pipe section 101 supports a pipe section 102 which is coupled to a down-turned branch of a horizontal pipe section 103 which is fitted into a lateral branch of the upright pipe section 97.

A horizontal pipe section 104 is fitted to the horizontal pipe section 99 and may have a goose neck or elbow 105 for connection to a pipe at the installation. The horizontal pipe 104 also has an upward branch carrying the vertical pipe section 106 which is fitted to the down-turned bell of a horizontal pipe section 107 fitted to the pipe section 103.

The pipe section 104 is shown as held in place by one of the clamps 29, 30 carried by the member 27.

It will be understood that many different forms of pipe assemblies may be accommodated when the vertical and horizontal adjusting devices are employed in combination.

Although we have disclosed herein the best form of the invention known to us at this time, we reserve the right to all such modifications and changes as may come within the scope of the following claims.

What we claim is:

1. A plumber's pipe jig comprising a table, table supports for the table, two substantially horizontal parallel longitudinal rails supported along one side of the table, one rail adjacent the top of the table and one intermediate the height of the table supports, at least one adjustable clamp on each longitudinal rail, at least one substantially vertical support engaged by both clamps, two substantially horizontal parallel transverse rails supported on the top of the table and extending angularly to the longitudinal rails, at least one adjustable clamp on each transverse rail, at least one substantially horizontal support mounted in both transverse rail clamps, and at least one adjustable pipe clamp mounted on each of the vertical and horizontal supports.

2. A plumber's pipe jig comprising a table, substantially horizontal parallel and vertically spaced apart longitudinal rails carried along one side of the table, clamps adjustably mounted on the longitudinal rails, vertical supports each engaged by clamps on both rails, pipe clamps adjustably mounted on the vertical supports, substantially horizontal parallel transverse rails supported on the top of the table and extending at substantially right angles to the longitudinal rails, clamps adjustably mounted to the transverse rails, horizontal supports each mounted in clamps of both transverse rails, and pipe clamps adjustably fitted to the transverse rails.

References Cited in the file of this patent

UNITED STATES PATENTS

| Number | Name | Date |
|---|---|---|
| 283,821 | Schafer | Aug. 28, 1883 |
| 356,937 | Harding | Feb. 1, 1887 |
| 552,951 | Bower et al. | Jan. 15, 1896 |
| 555,624 | Slotkin | Mar. 3, 1896 |
| 860,883 | Polson | July 23, 1907 |
| 1,313,061 | Brown | Aug. 12, 1919 |
| 1,465,330 | Ardner | Aug. 21, 1923 |
| 1,549,251 | Geyer | Aug. 11, 1925 |
| 1,591,574 | Stutsman | July 6, 1926 |
| 2,328,040 | Weightman | Aug. 31, 1943 |
| 2,431,101 | Woods | Nov. 18, 1947 |
| 2,470,487 | Hollis | May 17, 1949 |